US007532698B2

(12) United States Patent
Mertyurek et al.

(10) Patent No.: US 7,532,698 B2
(45) Date of Patent: May 12, 2009

(54) SYSTEMS AND METHODS OF PREDICTING A CRITICAL EFFECTIVE K FOR A NUCLEAR REACTOR

(75) Inventors: Ugur Mertyurek, Wilmington, NC (US); David Joseph Kropaczek, Wilmington, NC (US); Atul A. Karve, Wilmington, NC (US); Angelo P. Chopelas, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 69 days.

(21) Appl. No.: 11/606,320

(22) Filed: Nov. 29, 2006

(65) Prior Publication Data

US 2008/0123794 A1 May 29, 2008

(51) Int. Cl.
*G21C 17/00* (2006.01)
(52) U.S. Cl. .................. 376/245; 376/254; 376/255; 376/214; 376/215; 376/216
(58) Field of Classification Search .................. 376/245, 376/254, 255, 214, 215, 216
See application file for complete search history.

(56) References Cited

U.S. PATENT DOCUMENTS

| 4,077,836 | A | 3/1978 | Omori et al. |
| 4,515,749 | A | 5/1985 | Schoenig, Jr. et al. |
| 4,588,547 | A | 5/1986 | Impink, Jr. et al. |
| 4,990,302 | A | 2/1991 | Oda et al. |
| 5,490,184 | A | 2/1996 | Heibel |
| 6,061,412 | A | 5/2000 | Stucker et al. |
| 6,181,759 | B1 | 1/2001 | Heibel |
| 6,314,327 | B1 | 11/2001 | Mugler et al. |
| 6,801,593 | B2 | 10/2004 | Chao et al. |

*Primary Examiner*—Rick Palabrica
(74) *Attorney, Agent, or Firm*—Harness, Dickey & Pierce, PLC

(57) ABSTRACT

Systems and methods for a method for determining a critical effective k at an off-rated core state of a nuclear power plant includes determining, for the off-rated core state a control rod density, a percent core power, a gadolinium reactivity worth, a doppler reactivity worth, and a xenon reactivity worth responsive to a control rod pattern, a reactor power plan including the off-rated core state, and a reference effective k, calculating a change in an effective k from the reference effective k at the off-rated core state responsive to two or more parameters selected from the group consisting of the control rod density, the percent core power, the gadolinium reactivity worth, the doppler reactivity worth, and the xenon reactivity worth, and generating the critical effective k for the off-rated core state responsive to the change in the effective k from the reference effective k.

24 Claims, 5 Drawing Sheets

SYSTEMS AND METHODS OF PREDICTING A CRITICAL EFFECTIVE K FOR A NUCLEAR REACTOR

FIELD

The present disclosure relates to nuclear reactors and, more specifically, to systems and methods for designing and controlling operations of nuclear reactors.

BACKGROUND

The statements in this section merely provide background information related to the present disclosure and may not constitute prior art.

In nuclear power plants, core monitoring systems provide a controlled environment for processing raw plant data into operational limiting data such as maximum heat generation rate. Such systems monitor key reactor state information, such as margins to operating limits, axial and radial power, exposure distributions, total core power to provide information to evaluate past, current and future fuel performance. Additionally, such systems are often used to prepare plans for future operations, such as control rod sequence exchanges, startups, and power maneuvers, of the reactor based on the monitored data. The system can receive user input related to planned operations and can generate models and operational characteristics and plans in support of the planned operation. This can include simulations of the planned operation based on predefined and/or calculated operational parameters and characteristics. A core simulator can calculate current, expected, and planned neutron flux, power distributions, thermal performance as a function of control rod position, core loading pattern, coolant flow, reactor pressure, and other operational and design variables.

One of the most important reported reactor parameters is a ratio of the neutron gain to neutron loss sometimes referred to as the effective neutron multiplication factor, critical effective k, or critical k-eigenvalue, each of the terms being used interchangeably herein. This is the ratio of the average rate of neutron production by fission in the reactor core to the average rate of loss by absorption and leakage. The effective k is a constant that gives the information about the current state of the chain reaction or fission in the core. A value of effective k less than one indicates a decreasing number of chain reactions, whereas a value of the effective k greater than one indicates an increasing number of chain reactions at the current state of the reactor. A self-sustaining steady state reactor state is called the critical state of the reactor and theoretically in a steady state has a effective k equal to one. Unfortunately, due to uncertainties associated with the reactor data and the methodology to calculate the quantities, the effective k is not always equal to one. This special value of effective k is called the critical effective k.

During the planning stage of a reactor operation the reactors experience conditions that are below full power reactor conditions, referred to herein as off-rated conditions or operations that include control rod sequence exchanges, startups or power maneuvers from which reactor engineers prepare an operational plan for the reactor operators. Each off-rated condition places the reactor in a plurality of off-rated core states wherein the rate of neutron generation is increasing or decreasing differently than at full power, e.g., an effective k that is not equal to one. Reactor plans for off-rated conditions typically include calculating an estimate of the coolant flow rate at every stage of the operation for the targeted power level and the control rod pattern. The process is almost the reverse of the effective k calculation. The core systems support this process by providing predictions based on predefined rules and past operating data. The accuracy of the calculated coolant flow rate is important for reaching the targeted power level as fast as the regulated thermal limits will allow. A poor estimate of the flow rate results in small conservative increments in the flow rate necessary to reach the targeted power, which can result in increased time and expense to reach full power. A good estimate of the expected critical effective k for each state point in the off-rated condition will provide for more accurate predictions of coolant flow rate and optimized operation of the reactor.

However, typically either the design basis effective k or the rated last known effective k is used for flow calculations due to the current inability to accurately predict an expected critical effective k. Because the critical effective k is not a constant value it has been very difficult to predict because it is a function of the complex interaction of all parameters affecting the operation of the reactor core. The critical effective k can decrease as the cycle progresses and can change by about 600 pcm (percent-mille-reactivity) during the each fuel load cycle life time at full power rated conditions. This change is approximately piecewise linear and can be predicted by a design basis effective k. As the critical effective k changes as a function of the burnup, it can also change as much 700 pcm during these off rated conditions. The design effective k is calculated during the design process of the new refueled core and is expected to have an accuracy of 200 pcm. However, the design effective k does not address the off rated conditions where power is below 100%.

The determination of the flow rate is sensitive to the selected critical effective k and a 50 pcm difference in the critical effective k from that predicted can result in 2% difference in the flow rate. Consequently, employment of the design basis effective k or the last known value of the rated conditions critical effective k can produce as large as a 25% difference between the calculated and the actual flow rate during these off-rated power states.

Therefore, a prediction methodology to improve the calculation of an accurate critical effective k during off rated states and conditions is desired in order to optimize the operation of the reactor while maintaining desired safety margins.

SUMMARY

The inventor hereof has succeeded at designing improved systems and methods for predicting a critical effective k (k-eigenvalue) for one or more off-rated core states and associated coolant flow rates through the core during off-rated operations of a nuclear reactor. In some embodiments, by providing improvements in the accurate prediction of the critical effective k in off-rated core states, nuclear reactors can be designed and operated more efficiently and cost effectively during off-rated reactor conditions.

According to one aspect, a method for determining a critical effective k at an off-rated core state of a nuclear power plant includes determining, for the off-rated core state, a control rod density, a percent core power, a gadolinium reactivity worth, a doppler reactivity worth, and a xenon reactivity worth responsive to a control rod pattern, a reactor power plan including the off-rated core state, and a reference effective k. The method includes calculating a change in an effective k from the reference effective k at the off-rated core state responsive to two or more parameters at the off-rated core state selected from the group consisting of the control rod density, the percent core power, the gadolinium reactivity worth, the doppler reactivity worth, and the xenon reactivity worth. The critical effective k is generated for the off-rated core state responsive to the change in the effective k from the reference effective k at the off-rated core state.

According to another aspect, a method for determining a coolant flow rate in a nuclear reactor at an off-rated core state associated with off-rated reactor operation includes determining for the off-rated core state a control rod density, a percent core power, a change in the gadolinium reactivity worth, a change in the doppler reactivity worth, and a change in the xenon reactivity worth responsive to a control rod pattern, a reactor power plan defining a off-rated operation including the off-rated core state, and a reference effective k. A change in an effective k from the reference effective k for the off-rated core state is calculated responsive to two or more parameters selected from the group consisting of the change in control rod density, the percent core power, the change in the gadolinium reactivity worth, the change in the doppler reactivity worth, the change in the xenon reactivity worth, a type of plant, and a type of the off-rated operation. A critical effective k at the off-rated core state is generated responsive to the calculated change in the effective k from the corresponding reference effective k. A coolant flow rate for the reactor core is determined for the off-rated core state responsive to the generated critical effective k.

According to yet another aspect, a method for modeling critical effective k's at a plurality of off-rated core states in an off-rated operation of a reactor in a nuclear power plant includes estimating, for a plurality of off-rated core states, a control rod density, a gadolinium reactivity worth, a doppler reactivity worth, and a xenon reactivity worth responsive to a control rod pattern, a reactor power plan defining the off-rated core states and one or more reference effective k's. A change in the control rod density, a change in the gadolinium reactivity worth, a change in doppler reactivity worth, and a change in xenon reactivity worth, are each calculated with the change being relative to the corresponding received reference value and associated with each off-rated core state. A plurality of correlations affecting a neutron balance within the reactor at each off-rated core state are determined responsive to the percent core power, the change in the gadolinium reactivity worth, the change in the doppler reactivity worth, the change in the xenon reactivity worth, and the change in the control rod density. A change in the effective k is determined in response to the determined correlations for each off-rated core state. An actual critical effective k for one or more of the off-rated core states is compared to the estimated critical effective k for the corresponding off-rated core states and a type of plant is selected from the group consisting of xenon driven plant and a gadolinium driven plant, responsive to the comparing. A plurality of coefficients with at least one coefficient being identified for each of the determined correlations is identified as a function of an exposure at the off-rated core state, the selected plant type, and a type for the off-rated plant operation. A subset of the correlations and coefficients is selected in response to the selected plant type and the type of off-rated plant operation.

According to still another aspect, a system for determining a critical effective k at an off-rated core state in a nuclear reactor core includes a computer having a processor, a memory, an input configured for receiving a control rod pattern, a reactor power plan, a reference effective k, and computer executable instructions adapted for executing a method. The method executable by the computer executable instructions includes determining for the off-rated core state a control rod density, a percent core power, a gadolinium reactivity worth, a doppler reactivity worth, and a xenon reactivity worth responsive to a control rod pattern, a reactor power plan including the off-rated core state, and a reference effective k, and calculating a change in an effective k from the reference effective k at the off-rated core state responsive to two or more parameters at the off-rated core state selected from the group consisting of the control rod density, the percent core power, the gadolinium reactivity worth, the doppler reactivity worth, and the xenon reactivity worth. The method also includes generating the critical effective k at the off-rated core state responsive to the change in the effective k from the reference effective k at the off-rated core state.

In yet another aspect, a system for determining a critical effective k at an off-rated core state in a nuclear reactor core includes means for determining, for the off-rated core state, a control rod density, a percent core power, a gadolinium reactivity worth, a doppler reactivity worth, and a xenon reactivity worth responsive to a control rod pattern, a reactor power plan including the off-rated core state, and a reference effective k and means for calculating a change in an effective k from the reference effective k at the off-rated core state responsive to two or more parameters at the off-rated core state selected from the group consisting of the control rod density, the percent core power, the gadolinium reactivity worth, the doppler reactivity worth, and the xenon reactivity worth. The System also includes means for generating the critical effective k at the off-rated core state responsive to the change in the effective k from the reference effective k at the off-rated core state.

Further aspects of the present invention will be in part apparent and in part pointed out below. It should be understood that various aspects of the disclosure can be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Figure 1:
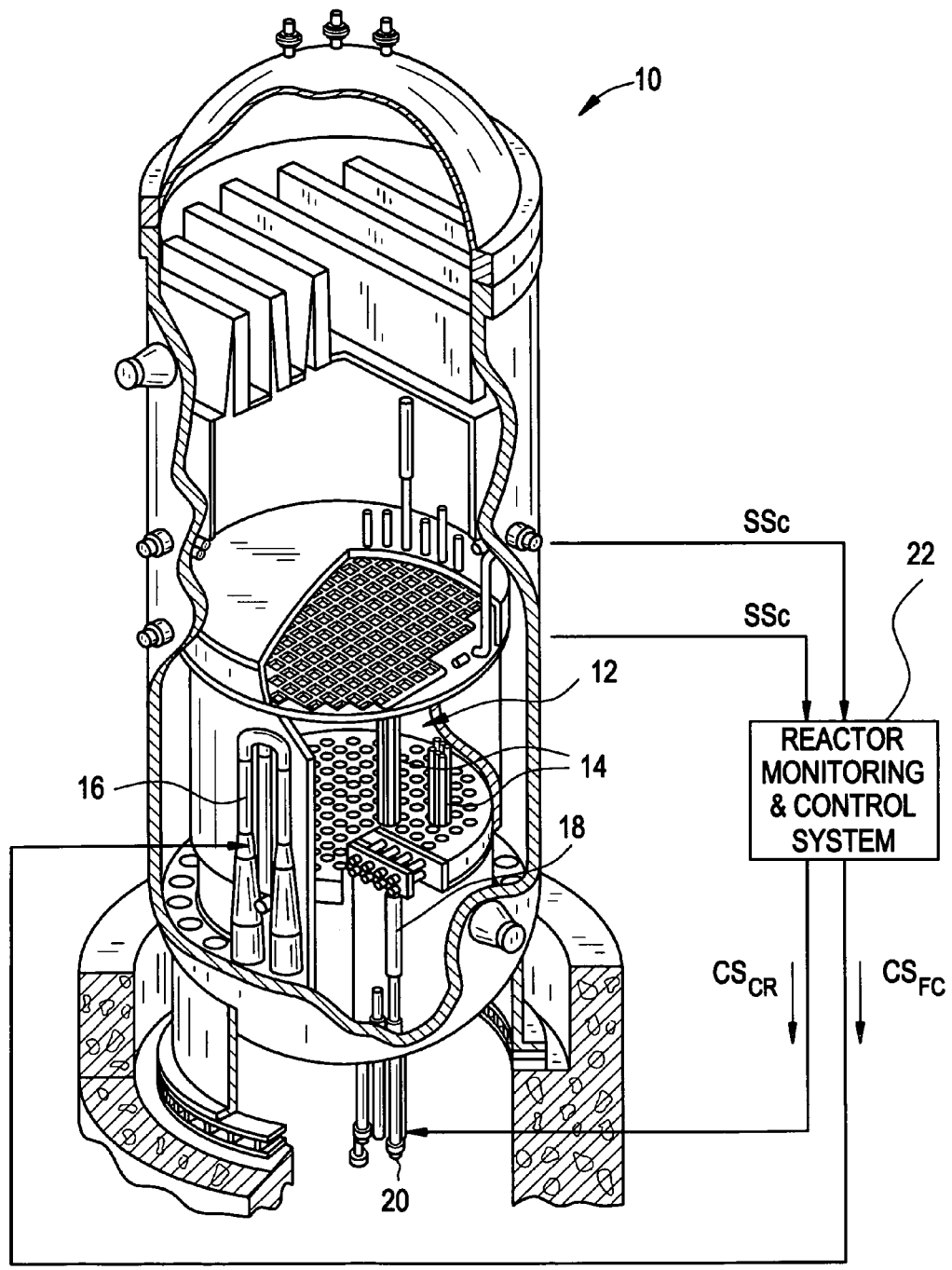
FIG. 1 is a sectional view, with parts cut away, of a boiling water reactor for some exemplary embodiments of the invention.

One exemplary embodiment of an nuclear reactor having some methods and systems for modeling and predicting a critical effective k for off-rated core conditions is illustrated in FIG. 1. FIG. 1 is a sectional view, with parts cut away, of a boiling water nuclear reactor pressure vessel (RPV) 10. Generally the illustrated components and parts are known to those skilled in the art and include various components associated with reactor control and monitoring including a reactor core 12. Heat is generated within the core 12, which includes fuel bundles 14 of fissionable material. A coolant, such as water, is circulated up through the core 12, in some embodiments via jet pumps 16 providing a controlling coolant flow through the reactor core 12. The amount of heat generated in the core 12 is regulated by inserting and withdrawing a plurality of control rods 18 of neutron absorbing material, for example, hafnium. To the extent that a control rod 18 is inserted into fuel bundle 14, it absorbs neutrons that would otherwise be available to promote the chain reaction which generates heat in core 12. The control rods 18 are controlled by a control rod drive (CRD) 20 which moves the control rod 18 relative the fuel bundles 14, thereby controlling the nuclear reaction within the core 12.

A reactor monitoring and control system 22 receives a plurality of core operations sensor signals $CC_S$ from sensors (not shown) in the core 12 and associated with the reactor 10 for monitoring operations of the core 12. This can include, but is not limited to, core reactor vessel pressure, coolant temperature, coolant flow rate, reactor power, and control rod position data. The reactor monitoring and control system 22 utilizes this input data for determining, among other characteristics, the thermal characteristics of the core, neutron escape, neutron loss, neutron generations, and actual effective k (e.g., k-eigenvalue) during each state of operation of the core 12. The reactor monitoring and control system 22 also can generate control signals CS for controlling one or more operations or characteristics of the reactor 10. This includes control signals $CS_{CR}$ for controlling the control rod drive 20 (and therefore the control rods 18) and control signals $CS_{FR}$ for controlling the fluid flow rate through the core 12. The generation of nuclear energy is controlled by the reactor monitoring and control system 22, which controls the control rods 18 and the coolant flow for controlling the core 12, especially during periods of reactor operation at less than a critical state, such as powering the reactor up and down. The reactor monitoring and control system 22 can also control these reactor operations based on pre-determined plans, which can be input into the system or prepared by the system as a function of predetermined algorithms or models for a planned operation such as a control rod exchange or power up or power down condition. In such plans, the scheduled reactor power level for each state in time and/or each exposure in the plan can be presented in a reactor power plan and related control rod control plan for the reactor operation. Other parameters, factors and correlations, including the effective k or change to the effective k from a reference effective k can be provided to or developed by the system 22 based on one or more predefined methods implemented, at least in part, within the system 22.

In one embodiment, a method for determining a critical effective k at an off-rated core state of a nuclear power plant includes determining, for the off-rated core state, a control rod density, a percent core power, a gadolinium reactivity worth, a doppler reactivity worth, and a xenon reactivity worth. As known to those skilled in the art, a reactivity worth is the effect that a parameter, characteristic or component has on the reactivity or fission of a reactor. Reactivity is a measure of the departure of a reactor from criticality and, as noted above, is defined as $r=(k_{eff}-1)/k_{eff}$, where $k_{eff}$ is effective k or the effective multiplication factor. Reactivity is usually expressed in units of cent, dollar, and in hours. The gadolinium worth is therefore the effect that gadolinium has on reactivity within the particular reactor plant, and similarly for xenon and doppler, e.g., doppler relating herein to temperature within the reactor. Each of these are determined as a function of, or referred to herein as being "responsive to" a control rod pattern or plan, a reactor power plan that includes identification and specification of one or more off-rated core states, and a reference effective k. As referred herein, "off-rated" refers to a power condition that is less than 100 percent and wherein the reactor is not in a critical state. A reference effective k can be any predetermined effective k, such as, by way of example, a design basis effective k or a last recorded rated effective k.

The method includes calculating a change in an effective k from a predefined reference effective k at one or more off-rated core states responsive to two or more parameters at the corresponding off-rated core state or states. These two or more parameters include the control rod density, the percent core power, the gadolinium reactivity worth, the doppler reactivity worth, and the xenon reactivity worth. The critical effective k is generated for each desired off-rated core state responsive to the change in the effective k from the reference effective k at the off-rated core state. For instance, this can be a simple adjustment to the reference effective k by the change in some embodiments, or in others can be defined by a more complex or scaled relationship as determined by modeling of the particular reactor plant or types of plants.

Additionally, this can include modeling the reactor with two or more of these parameters, establishing correlations with one or more of the parameters that can effect the change in the effective k from the reference effective k at the off-rated core state. This can also include a determination of changes between a parameter or correlation of parameters from a reference value thereof, rather than simply a determination of the absolute value of one or more parameters. For instance, this can include a change in the gadolinium, doppler, and/or xenon reactivity worth, or a change in the control rod density, from a corresponding reference value thereof, for each associated off-rated core state. In such embodiments, a change in the effective k from a predetermined reference effective k can be developed from these individual change values and correlations.

Modeling of the critical effective k or the changes of delta effective k can also include the identification and/or determinations of corresponding coefficients as are typical in modeling. This would be particularly applicable in embodiments that provide for predicting effective k values for off-rated core states by using, at least in part, an empirical correlation polynomial.

One embodiment can include the identification of a summary or global set of correlations and coefficients that attempt to affect all impacts and changes in the effective k for accurate predictions. In such cases, a complex relationship is determined and each and every parameter and correlation is applied and accounted for. This can provide for a very accurate prediction of the effective k or delta effective k, e.g., the change or difference between the predicted effective k and a reference effective k.

In some cases, an all encompassing embodiment can be difficult, complex and costly to implement. However, as will be discussed, simplified methods utilizing subsets of the global set can be very effective in predicting the effective k in off-rated core conditions based on one or more factors, such as the type of off-rated core operation (e.g., beginning of cycle, in cycle start-up, power maneuver down power, power maneuver up power, rod exchange sequence down power, and rod exchange sequence up power, etc.), a predetermined plant classification or type determination as discussed herein, and/or an exposure at the off-rated core state. Each of subset of correlations and coefficients can be developed for each reactor plant at an initial system analysis and setup or can be adjusted based on experience, measurements, or fine tuning during plant operations.

After the effective k is predicted for one or more off-rated states, a core coolant rate for each off-rated core state can be determined or calculated as a function of the predicted effective k, the control rod pattern or changes to the control rod density, and the reactor power plan (such as the percent of power). As is known in the art, control rod density tends to be a misnomer. Generally, as is known in the art, control rod density refers to the control rod concentration present at that state point and is equal to the length of the inserted portion of the control rods over the maximum length that the control rods can be inserted in the reactor core.

In some embodiments, the critical effective k can be mathematically modeled or programmed in computer executable instructions for each off-rated core state in an off-rated reactor condition by correlations of one or more parameters including percent power, control rod density, gadolinium reactivity worth, xenon reactivity worth, and doppler reactivity worth. As noted above, the reactivity worth parameters can be determined for each nuclear reactor plant such as during an initial plant analysis or characterization, but can be adjusted during plant operations for fine-tuning. Each nuclear reactor plant has characteristics that are unique to that plant and cannot be easily predicted based on design or predetermined factors.

The critical effective k can be modeled through correlating one or more of these parameters with each other and through determination of coefficients or weightings to one or more of the correlations. The critical effective k, for instance, can be modeled as a normalizing coefficient and a different coefficient multiplied by each correlation. Examples of correlations having more than one parameter include the percent power times the control rod density; the percent power times the xenon reactivity worth; the xenon reactivity worth time the control rod density; the percent power times the gadolinium reactivity worth; the control rod density times the doppler reactivity worth; the control rod density times the gadolinium reactivity worth; the percentage power times the doppler reactivity worth; the percent power to a power of j; the control rod density to the power of j; and the xenon reactivity worth times the gadolinium worth.

As noted, the coefficients for each parameter or correlation can be determined at the time of initial plant modeling. For instance, after determining the various parameters and correlations, each set of correlations can be compared to actual off-rated effective k's as measured during plant operation. Each parameter, factor, and correlation can be weighted through computer modeling to determine each coefficient such that the coefficients provide a mathematical best fit relationship between the correlations and the actual effective k for a plurality of off-rated states.

As noted above, the prediction of critical effective k can be made not on the absolute estimates as described above, but on a change of the predicted critical change in effective k from a reference effective k. In such modeling, the change in the critical effective k from the reference effective k for each off-rated core state "i" can be modeled with a normalizing coefficient and a coefficient multiplied by one or more of the following correlations that are determined for each off-rated core state as a change from the associated predetermined reference value as described above.

By way of example, in one embodiment a change in the effective k from the rated power reference point value for each reference point in an off-rated condition can be described by a relationship defined by the coefficients and correlations of parameters. For example, one such relationship can be described by a mathematical formula as illustrated, by way of example, in equation [1]:

$$\Delta k^i = a_0 + a_1 \Delta Cr^i + a_2 P^i + a_3 \Delta Gd^i + a_4 \Delta Dp + a_5 \Delta Xe^i + a_6 P^i \Delta Cr^i + a_7 P^i \Delta Xe^i + a_8 \Delta Xe^i \Delta Cr^i + a_9 P^i \Delta Gd^i + a_{10} \Delta Cr^i \Delta Dp^i + a_{11} \Delta Cr^i \Delta Gd^i + a_{12} P^i \Delta Dp^i + a_{13} (P^i)^j + a_{14} (\Delta Cr^i)^j + a_{15} \Delta Xe^i \Delta Gd^i + a_{16} \Delta Xe^i \Delta Dp^i \quad [1]$$

wherein each parameter means:
Cr: Control rod density in the core
P: Percent Core Power
Gd: Gadolinium Worth
Xe: Xenon Worth
Dp: Doppler Worth
i i-th state point in the off-rated condition A further detailed definition of these parameters and therefore correlations is now provided:

i-th power=an off-rated core state defined by the off-rated operation and having a percentage power less than 100 and an effective k not equal to one delta—a change in the parameter at the off-rated state from the reference value for that parameter at the same off-rated state and can be further defined in as the relationship of: $\Delta Y^i = Y^i - Y_{reference}$ where Y=k, Cr, Gd, Xe, and Dp.

$a_n$=a coefficient determined as a normalizing coefficient or weighting coefficient for an associated correlation. Each coefficient can generally be a positive or negative number as determined by the modeling and weighting associated for a particular nuclear plant k=critical effective k with delta k to the i-th power being the change of the effective k at the off-rated core state from the reference effective k at same i-th off-rated core state Cr=control rod density with delta Cr to the i-th power being the change of the control rod density at the i-th rated core state from the reference control rod density at the same i-th off-rated core state and the delta Cr to the i-th power taken again to the j-th power P=percentage of total power with P to the i-th power being the percentage of power at the i-th off-rated core state and P to the i-th power taken again to the j-th power Xe=the xenon reactivity worth with delta Xe to the i-th power being the change in the xenon reactivity worth at the i-th off-rated core state from the reference xenon reactivity worth at the same i-th off-rated core state Gd=the gadolinium reactivity worth with delta Gd to the i-th power being the change in the gadolinium reactivity worth at the i-th off-rated core state from the reference gadolinium reactivity worth at the same i-th off-rated core state Dp=the doppler (temperature) reactivity worth with delta Dp to the i-th power being the change in the doppler reactivity worth at the i-th off-rated core state from the reference doppler reactivity worth at the same i-th off-rated core state.

As noted above, while modeling of critical effective k can be provided with the complete correlations and coefficients as discussed above and as illustrated in the relationship of equation [1], in some embodiments, modeling of effective k in off-rated states can be simplified and streamlined. In some embodiments, such simplification and streamlining can be based on a type of off-rated operation and in some cases can be based on a predetermined identification of primary parameters or factors affecting a nuclear plant, plant type classification or categorization.

With regard to simplified modeling and prediction for off-rated operations, when the reactor is in the start up mode, such as after a refueling, a subset of these parameter and correlations can be utilized to provide a very reliable prediction of the changes of the effective k and therefore predict the effective k. A different subset has been shown for other critical operations including control rod maneuvers or rod exchange sequences.

As noted, simplified modeling and prediction can also be based on predetermined plant type classification. This simplification scheme can include identifying a nuclear plant by a type or category that can later by used in modeling and prediction of critical effective k's at off-rated states. For example, some nuclear plants can be identified as a xenon driven plant where the primary and overriding parameter and associated correlations and coefficients that affect the prediction of a critical effective k are the changes in the control rod density from the rated power reference point, the percent power and the xenon reactivity worth, or at least the change in the xenon reactivity worth from the rated power reference point. In such xenon driven plants, the correlations based on the doppler reactivity worth and the gadolinium reactivity worth provide an insignificant impact on accurately predicting the critical effective k and as such, can be ignored in the modeling and prediction process. Rather, the xenon reactivity worth, percentage power and control rod density can be solely used in the correlations and coefficients determined and/or adjusted to correctly and accurately predict the critical effective k, or changes thereof relative to the reference effective k, in each of the off-rated core states.

The identification or selection of a plant type can be done from modeling or comparison utilizing a variety of factors and methods. For example, a comparison of a predicted absolute value or change in the effective k from a reference effective k for one or more off-rated core states to a measured effective k for the off-rated core state during the subsequent actual operation of the reactor plant can be used. By comparing and modeling the variety of correlations, and identifying coefficients thereto, a type of plant can be identified that best matches the particular operation of the plant. For example, the inventors have identified that many plants can be classified as either a xenon driven plant or a gadolinium driven plant based on a comparison and/or modeling. In such cases, a plant operation such as a beginning of cycle startup can be simplified and streamlined by utilizing a subset of parameters and correlations based on the predetermination that a plant is either a gadolinium driven plant or a xenon driven plant.

Of course, classifications of plant type are also possible during the initial modeling and analysis of the above described parameters, correlations, coefficient determinations, and comparisons to actual or measured parameters and characteristics. This can include, but is not limited to, doppler reactivity driven plants, control rod density driven plants.

Such simplified modeling and prediction can also affect other methods. For example, in one exemplary embodiment an identification and classification of a plant type as being xenon reactivity driven or gadolinium reactivity driven may only apply in one or more off-rated core operations such as during an initial reactor startup, e.g., such as a beginning of a cycle (BOC), e.g., may not apply for power up or power down in-cycle maneuvers including control rod exchange sequences or in cycle startups. As such, the simplified modeling and prediction of critical effective k provided by identification of a nuclear plant by a particular predetermined plant type, may not apply in non-BOC off-rated operations.

However, in those non-BOC off-rated operations, other simplified modeling and prediction of critical effective k can apply based on other plant classifications and/or based on type of off-rated operation. In-cycle startups and/or power up and power down maneuvers can each be modeled using a subset of the above parameters and correlations in some scenarios. For example, in some embodiments one simplified model and prediction method can be developed for power up maneuvers and another for power down maneuvers. Simplified modeling and predictions can also be developed for other off-rated operations.

In one such simplified embodiment of modeling and prediction of critical effective k, a plant can be identified as a xenon driven plant. In such exemplary embodiments, the determination of the critical effective k or changes in the critical effective k relative to the reference effective k for the particular off-rated core state in a beginning of cycle start up can be condensed as illustrated, by way of example, in the relationship exemplified by equation [2].

$$\Delta k^i = a_0 + a_1 \Delta Cr^i + a_2 P^i + a_5 \Delta Xe^i + a_6 P^i \Delta Cr^i + a_7 P^i \Delta Xe^i + a_8 \Delta Xe^i \Delta Cr^j \quad [2]$$

In one exemplary embodiment of such a modeling and prediction method, a selection of coefficients can be applied to relationship as illustrated by equation [2] and is illustrated by way of example in equation [2B].

$$\Delta k^i = -1.77E-3 + 3.54E-2\Delta Cr^i + 1.75E-5P^i + 2.46E-1\Delta Xe^i - 3.42E-3P^i \Delta Xe^i - 4.22\Delta Xe^i \Delta Cr^i + 5.94E-5P^i \Delta Cr^j \quad [2B]$$

Figure 2:
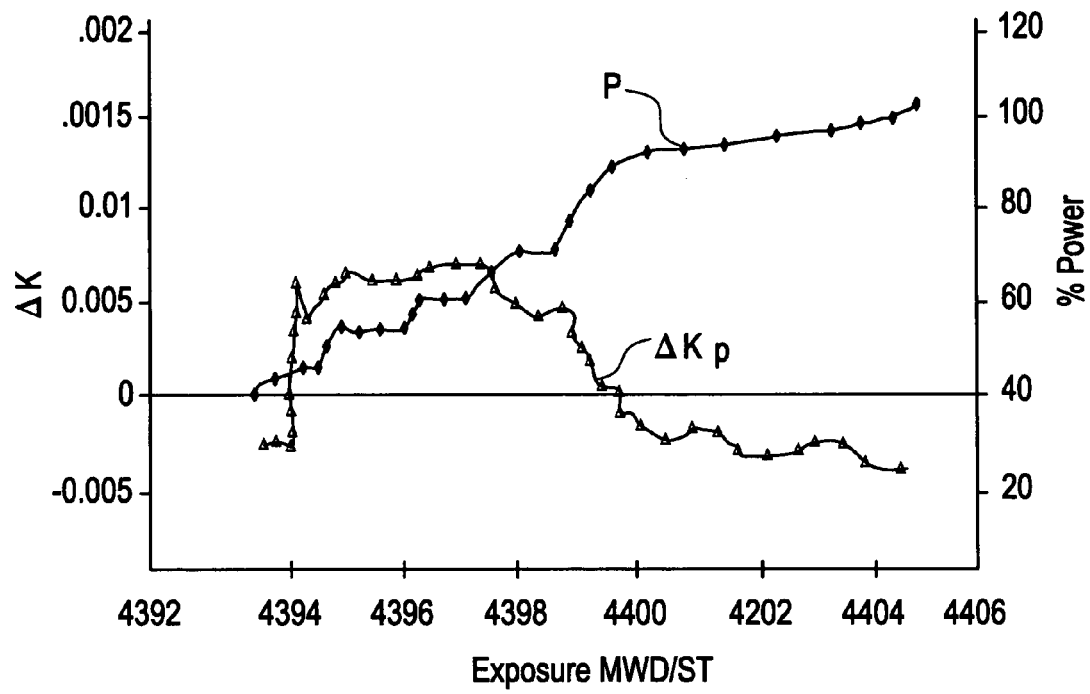
FIG. 2 is a graph of a predicted effective k for an off-rated beginning of cycle operation relative to the percentage power as a function of exposure according to one exemplary embodiment.

FIG. 2 illustrates the predicted delta effective k values for the off-rated core states in a beginning of cycle startup of a plant previously identified as a gadolinium driven plant. As shown in FIG. 2, the predicted delta effective k values are illustrated with reference to zero for a plurality of exposures associated with states for percentage powers from 40 percent to 100 percent. The predicted delta or change in effective k values start off around 40 percent power at less than 0 or negative and increase to around 0.005 from power percentages from 42 percent to 65 percent. As power increases about 65 percent, the predicted effective k decreases from 0.005 down to zero at around 80 percent power and then drops below zero up to 100 percent power. These values for changes to effective k can be used in conjunction with a reference effective k to provide an improved predicted effective k for planning operations of the reactor, such as, by way of example, an optimized coolant flow rate at each of the off-rated states for the off-rated power operation. The improved accuracy of this exemplary prediction will be addressed below and in reference to FIG. 6.

As another exemplary embodiment, a nuclear reactor plant analysis of the nuclear plant operations and neutron impacting factors/parameters within the core can identify that a plant is should more accurately be categorized as a gadolinium driven plant type. Similar to addressed above with regard to the xenon type plant, a plant can be classified or identified as a gadolinium plant type where the gadolinium reactivity worth is determined to be predominate factor in addition to the control rod density and the percent power. In some embodiments, as illustrated by way of one example in the relationship of equation [3], a gadolinium type plant can be modeled for core startup in a simplified manner as compared to the relationship illustrated in equation [1] as a subset of the coefficients, parameters, and correlations.

$$\Delta k^i = a_0 + a_1 \Delta Cr^i + a_2 P^i + a_3 \Delta Gd^i + a_4 \Delta Dp + a_6 P^i \Delta Cr^i + a_9 P^i \Delta Gd^i + a_{10} \Delta Cr^i \Delta Dp^i + a_{11} \Delta Cr^i \Delta Gd^i + a_{13}(P^i)^j \quad [3]$$

As shown, the relationship as summarized by way of example in equation [1] can be simplified to only include the normalizing coefficient, the change to the control rod density, the percent power, the change of the gadolinium reactivity worth; the change to the percent doppler reactivity worth, the percent power times the change to the control rod density, the percent power times the change to the gadolinium reactivity worth, the change to the control rod density time the change to the doppler reactivity worth, the change to the control rod density times the change in the gadolinium reactivity worth and the percent power to a power of j.

The normalizing coefficient as well as the coefficients $a_n$ for each of the correlation terms can be determined at the time of initial system analysis and modeling and used thereafter in off-rated core condition planning. Additionally, during plant operation, one or more of the coefficients $a_n$ can be changed or adjusted to fine-tune or adjust the relationship and/or model based on continued analysis and further comparison of predicted critical effective k's at off-rated core states to actual critical effective k's determined in response to operational measurements. One example of the relationship coefficients $a_n$ of equation [3] is illustrated in equation [3B].

$$\Delta k^j = -5.427E-3 - 2.71E-1\Delta Cr^j + 2.52E-4P^i + 3.12\Delta Gd^i - 9.86E-1\Delta Dp + 2.75E-3P^i\Delta Cr^j - 4.45E-2P^i\Delta Gd^i + 56.4\Delta Cr^j\Delta Dp^i - 17.3\Delta Cr^j\Delta Gd^i - 2.03E-6(P^i)^2 \quad [3B]$$

As noted above, the modeling and prediction of the critical effective k at off-rated states can also be simplified based on classification or identification of the off-rated plant operation. As noted above, the classification of a plant type, for example xenon driven, gadolinium driven, or doppler driven, can provide for simplified improved prediction for beginning of cycle reactor startups. However, in non-startup off-rated maneuvers, in some embodiments, these plant type classifications may not be as applicable.

In some embodiments for power up and power down maneuvers, not associated with beginning of cycle startup, a simplified modeling and prediction of the critical effective k can be modeled as a subset of coefficients, parameters, and correlations that include a normalizing coefficient, the change in control rod density; the percent power, the change in gadolinium reactivity worth; the change in doppler reactivity worth; the change in xenon reactivity worth; the percent power times the change in control rod density; the percent power times the change in the xenon reactivity worth; the change in the xenon reactivity worth times the change in the control rod density; the percent power times the change in the gadolinium reactivity worth; the change in the control rod density times the change in the doppler reactivity worth; the change in the control rod density times the change in the gadolinium reactivity worth; the percentage power times the change in the doppler reactivity worth; the percent power to a power of j; the change in the control rod density to the power of j; and the change in the xenon reactivity worth times the change in the gadolinium reactivity worth.

$$\Delta k^j = a_0 + a_1\Delta Cr^j + a_2P^i + a_3\Delta Gd^i + a_4\Delta Dp + a_5\Delta Xe^i + a_6P^i\Delta Cr^j + a_7P^i\Delta Xe^i + a_9P^i\Delta Gd^i + a_{16}\Delta Xe^i\Delta Dp^i \quad [4]$$

However, during an in-cycle up powering maneuver, in some embodiments the relationship can be adjusted by replacing the correlation of the change in the xenon reactivity worth times the change in the doppler reactivity worth, as discussed above and as shown in an exemplary relationship of equation [4], with a different correlation. For up power maneuvers, rather that term can be replaced with a different correlation, the change in the xenon reactivity worth times the change in the gadolinium worth. Such a relationship can be illustrated by way of example in a relationship as illustrated in equation [5] for non-beginning of cycle up power maneuvers.

$$\Delta k^j = a_0 + a_1\Delta Cr^j + a_2P^i + a_3\Delta Gd^i + a_4\Delta Dp + a_5\Delta Xe^i + a_6P^i\Delta Cr^j + a_7P^i\Delta Xe^i + a_9P^i\Delta Gd^i + a_{15}\Delta Xe^i\Delta Gd^i \quad [5]$$

One embodiment of the relationship illustrated in equation [5] with exemplary coefficients is illustrated, by way of example, in equation [5B].

$$\Delta k^j = 0.019 - 0.12\Delta Cr^j - 1.19E-4P^i + 8.61\Delta Gd^i - 2.81\Delta Dp^i - 1.14\Delta Xe^i + 2.16E-3P^i\Delta Cr^j + 0.017P^i\Delta Xe^i - 0.13P^i\Delta Gd^i + 258.08\Delta Xe^i\Delta Gd^i \quad [5B]$$

Figure 3:
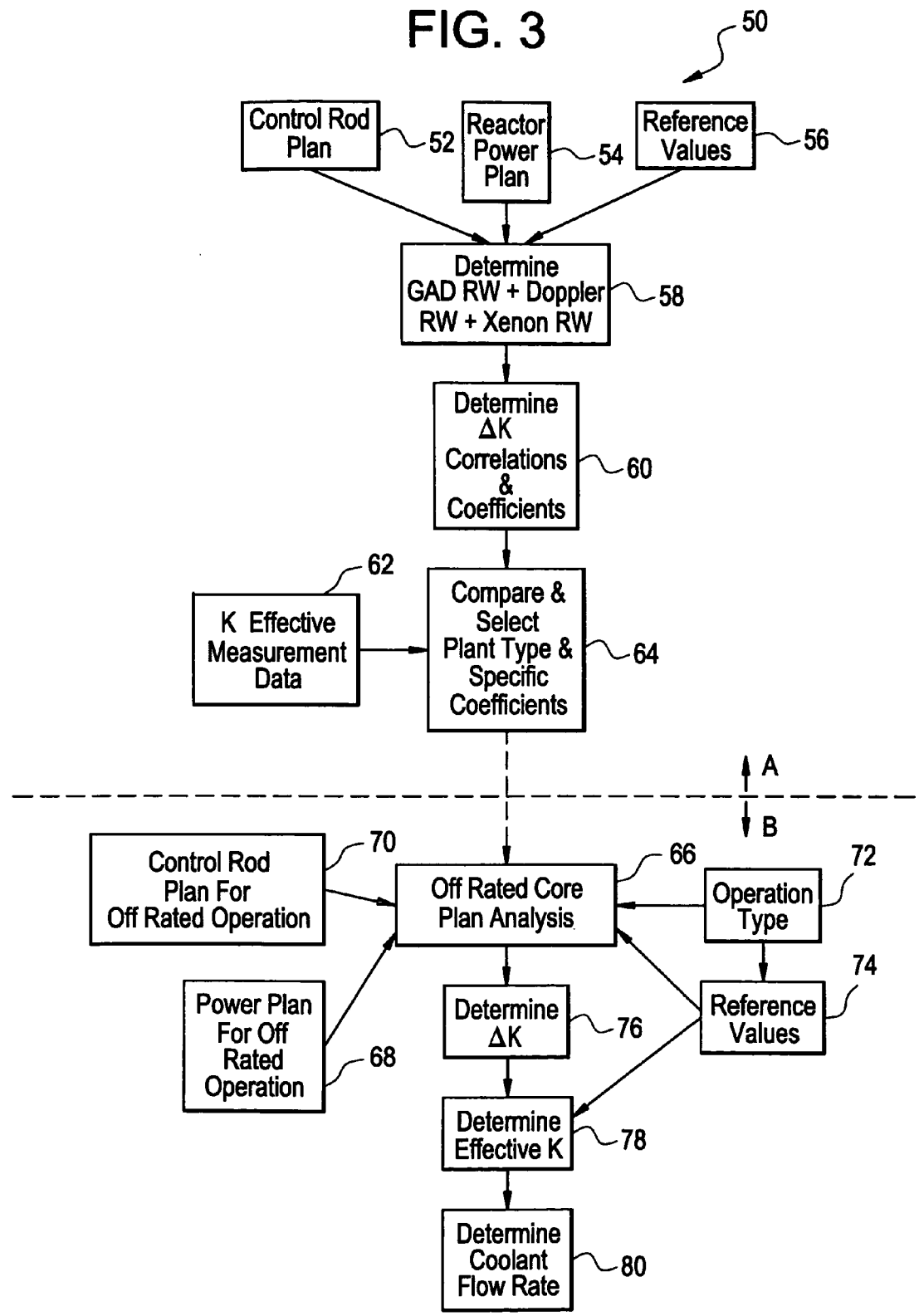
FIG. 3 is a flow chart of a method of predicting a critical effective k in off-rated states according to one exemplary embodiment.

Referring now to FIG. 3, a flow chart 50 illustrates one embodiment of a two phase plant modeling. Phase A illustrated above the dotted line, is typically performed during initial analysis and system and method implementation. Phase A provides for the selection and/or identification of one or more plant typing or categorization. Additionally, the parameters including one or more reactivity worths are determined and coefficients associated with the critical effective k prediction parameters and correlations as described above are defined or determined. Phase B is typically performed during a second or subsequent off-rated core operation for the prediction of changes to the effective k from the reference effective k for each off-rated state defined in the subsequent off-rated core operation.

Phase A can begin by receiving a control rod plan from process 52, a reactor power plan from process 54, and one or more reference values from process 56. Process 58 provides for the determination of the gadolinium reactivity worth, the xenon reactivity worth, and the doppler reactivity worth, as well and changes to each of those determined worths from provided reference values. This is typically performed for each of the plurality of off-rated core states in the reactor power plan of process 54. A change in the effective k from a reference effective k is determined in process 60 along with a plurality of correlations, such as those described or a subset thereof as illustrated in equation [1] above, by way of example. Measured or actual effective k's are received from process 62 by process 64. These actual effective k's can be determined from actual operation of the reactor plant based on the reactor power plan and control rod plan. Process 64 compares these actual effective k's to the correlations and predicted effective k's, and coefficients are typically adjusted and refined and one or more plant types are selected or identified based on the comparison.

Phase B receives the results of phase A from process 64 in process 66. A subsequent off-rated power plan is provided in process 68 and an associated control rod configuration plan is provided in process 70, each of which are received for which a prediction of critical effective k is desired. The operation is identified by type in process 72, as described above, and one or more reference values are provided in process 74 are identified for the operation. These reference values can include a reference effective k based on the operation type or plant type, or can be based on the last-rated effective k values or a design basis effective k value. Based on the plant type, the operation type, the provided parameters and correlations, a change in the effective k from the reference effective k is determined in process 76. An absolute value for the critical effective k is determined in process 78 as generally described above and by utilizing the output of process 76 and the reference effective k from process 74. A coolant flow rate for each off-rated core state in the subsequent off-rated power plan 68 can then be generated in process 80. Of course, as known to those skilled in the art, other off-rated processes can also be adjusted based on the predicted change in the effective k from process 76 or the predicted effective k of process 78.

As noted above, some methods described herein provide for an initial analysis and plant type selection when implementing in a particular nuclear plant as shown by illustrated in FIG. 3 as phase A. Additionally adjustments to these initial determinations can also be made during plant operation, generally to refine the initial modeling including the initial set of gadolinium, xenon, and doppler reactivity worths and the initial coefficients. Additionally, new or different plant types can also be made based on further modeling or changes in the plant over time, by design, or by operation. As such, each of the methods or processes, even those identified as phase A, can be viewed as first steps or operations, or subsequently as one or more second operations. Such second operations can include one or more off-rated plant operations defined by a second control rod pattern, a second reactor power plan defining a second plurality of off-rated core states for a particular type of off-rated reactor operation defining off-rated core states over the planned exposures, a second plurality of reference effective k's, a second reference control rod density, and second reference reactivity worths. Each of these would be utilized to predict critical effective k's or changes thereto for the off-rated core states in the second reactor power plan.

Figure 4:
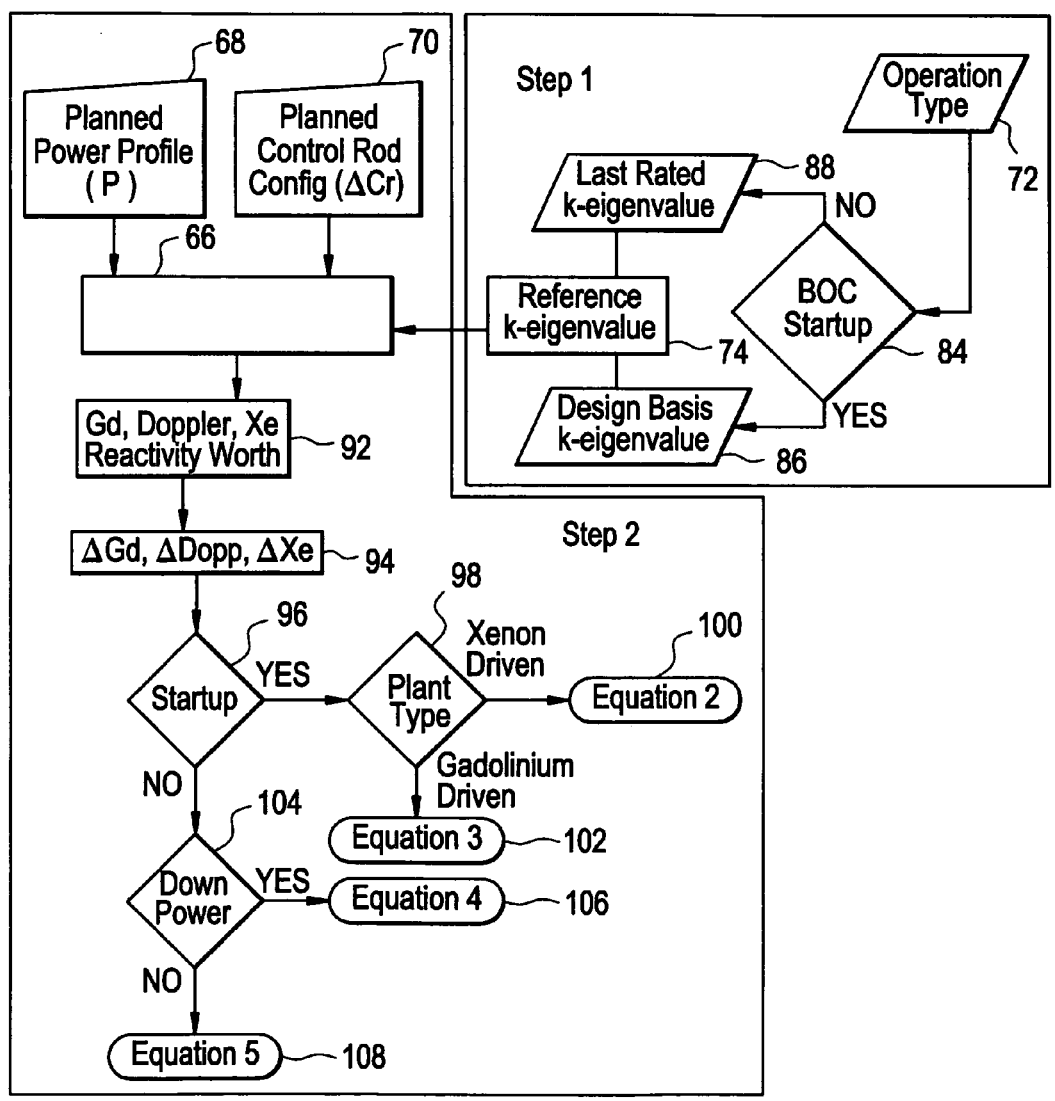
FIG. 4 is a flow chart of another method of predicting a critical effective k in off-rated states according to another exemplary embodiment.

Referring now to FIG. 4, an additional exemplary embodiment of subsequent second operations is described. In process 82, a first step is identified in which the operation type 72 is first identified. In this example, it is first determined in process 84 whether the operation is a beginning of cycle startup or not. If it is a beginning of cycle startup, a design basis effective k from process 86 is identified as the reference effective k for process 74. However, if it is not a beginning of cycle start, a last rated effective k from process 88 is used as the reference effective k in 74.

The analysis process 66 receives the reference effective k from process 74, the planned power plan or profile from process 68 and the planned control rod configuration from process 70. The reactivity worths for gadolinium, xenon, and doppler are determined in process 92 and the changes to those reactivity worths are determined in process 94. Next, if the off-rated operation is a startup operation, the previously identified plant type is considered in process 98. If the plant was identified as being xenon driven, process 100 provides for the determination of the critical effective k values by a simplified relationship defined, by way of example, with equation [2] above. If the plant was identified as being gadolinium driven, process 102 provides for the determination of the critical effective k values by a different simplified relationship as defined, by way of example, with equation [3]. However, if the operation is not a startup operation but is a down power operation, process 104 provides that the critical effective k values be determined by a simplified relationship defined, by way of example, with equation [4]. If the operation is not a startup operation but is an up power or power up operation, process 104 provides that the critical effective k values be determined by a simplified relationship defined, by way of example, with equation [5].

Of course, as understood by those skilled in the art, other process flows, models or equations, while not illustrated by the flows of FIGS. 3 and 4 are also possible and still within the scope of this disclosure.

Some embodiments include a system for determining a critical effective k at an off-rated core state in a nuclear reactor core includes a computer having a processor, a memory, an input configured for receiving a control rod pattern, a reactor power plan, and a reference effective k, and computer executable instructions adapted for executing a method. The method executable by the computer executable instructions includes one or more of the methods as described above, and variations to such described methods as understood by those skilled in the art after reviewing this disclosure.

Figure 5:
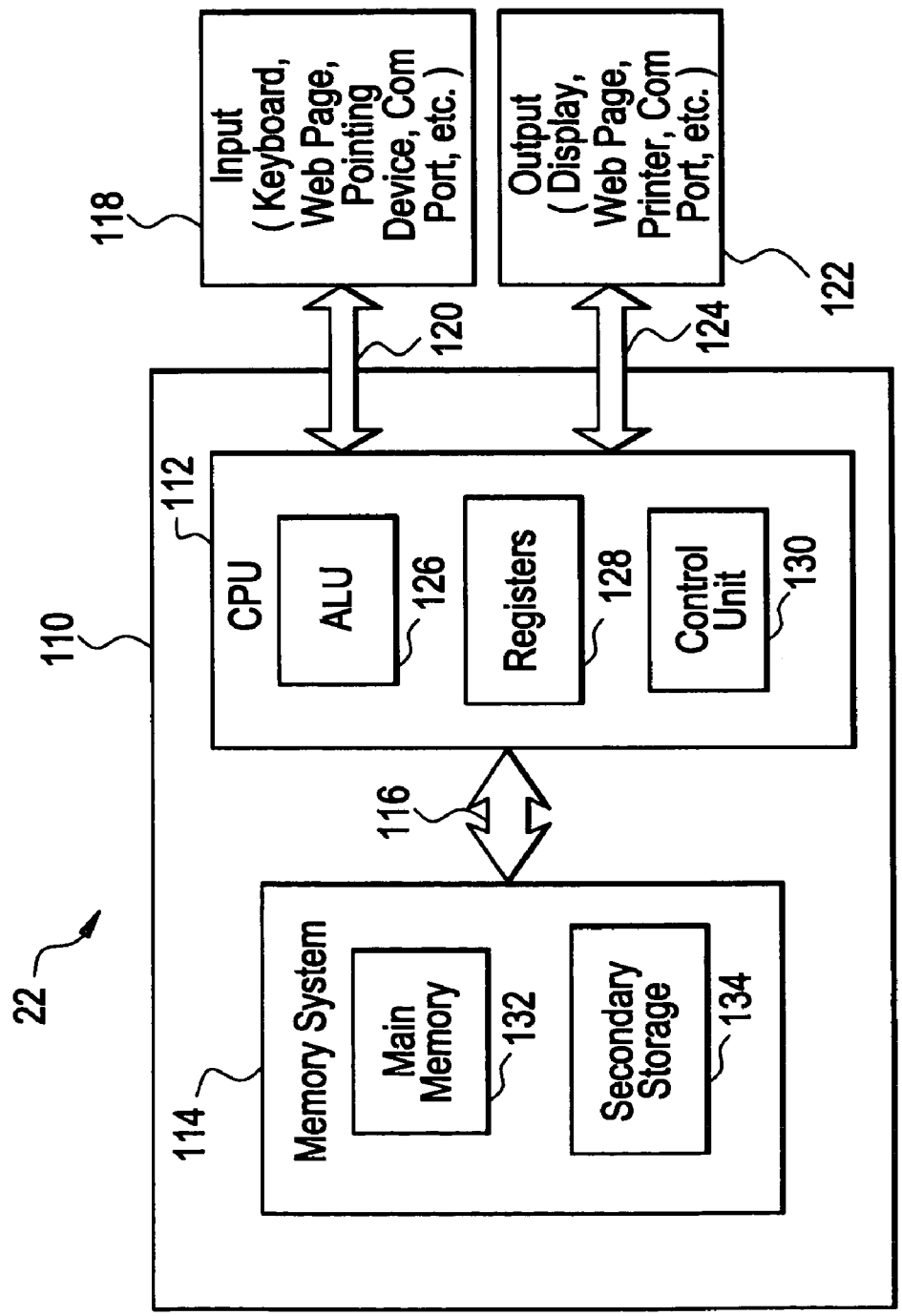
FIG. 5 is a block diagram of an exemplary computer system that can be used to implement some embodiments or components of the system and/or method for predicting and/or modeling critical effective k at off-rated core states.

One exemplary computer operating environment for one or more embodiments for determining the worths and correlations, predicting the effective k values and delta of change effective k values, and determining the adjusted effective k values and coolant flow rates, is illustrated in FIG. 5, by way of example. The operating environment for a reactor core monitoring and planning or prediction system 22 can include a computer 112 that comprises at least one high speed processing unit (CPU) 112, in conjunction with a memory system 114 interconnected with at least one bus structure 116, an input 118, and an output 122.

The input 118 and output 122 are familiar and can be implemented associated with the local and remote user interfaces as well as a controller, remote operational system and operations system, by way of example. The input 118 can include a keyboard, a mouse, a physical transducer (e.g. a microphone), or communication interface or port, by way of example, and is interconnected to the computer 110 via an input interface 120. The output 122 can includes a display, a printer, a transducer (e.g. a speaker), output communication interface or port, etc., and be interconnected to the computer 110 via an output interface 124. Some devices, such as a network adapter or a modem, can be used as input and/or output devices.

The illustrated CPU 112 is of familiar design and includes an arithmetic logic unit (ALU) 126 for performing computations, a collection of registers 128 for temporary storage of data and instructions, and a control unit 130 for controlling operation of the system 110. Any of a variety of processors, including at least those from Digital Equipment, Sun, MIPS, Motorola/Freescale, NEC, Intel, Cyrix, AMD, HP, and Nexgen, is equally preferred for the CPU 112. The illustrated embodiment of the disclosure operates on an operating system designed to be portable to any of these processing platforms.

The memory system 114 generally includes high-speed main memory 132 in the form of a medium such as random access memory (RAM) and read only memory (ROM) semiconductor devices, and secondary storage 134 in the form of long term storage mediums such as floppy disks, hard disks, tape, CD-ROM, flash memory, etc. and other devices that store data using electrical, magnetic, optical or other recording media. The main memory 132 also can include a video display memory for displaying images through a display device. Those skilled in the art will recognize that the memory system 114 can comprise a variety of alternative components having a variety of storage capacities.

As is familiar to those skilled in the art, the system 22 can further include an operating system and at least one application program (not shown). The operating system is the set of software which controls the computer system's operation and the allocation of resources. The application program is the set of software that performs a task desired by the user, using computer resources made available through the operating system. Both are resident in the illustrated memory system 114. As known to those skilled in the art, some of the methods, processes, and/or functions described herein can be implemented as software and stored on various types of computer readable medium as computer executable instructions. In various embodiments of the stabilized radioactivity measurement system described by example herein, the computer system can include a robust operating and application program having the computer executable instructions for performing one or more of the above processes. Additionally, one or more of the local and remote user interfaces, operations system and remote operations system can include, among other application software programs with computer executable instructions, a thin client application for communicating and interactively operating with one or more controllers as described above by way of example.

In accordance with the practices of persons skilled in the art of computer programming, the present disclosure is described below with reference to symbolic representations of operations that are performed by the system 22. Such operations are sometimes referred to as being computer-executed. It will be appreciated that the operations which are symbolically represented include the manipulation by the CPU 112 of electrical signals representing data bits and the maintenance of data bits at memory locations in the memory system 114, as well as other processing of signals. The memory locations where data bits are maintained are physical locations that have particular electrical, magnetic, or optical properties corresponding to the data bits. The disclosure can be implemented in a program or programs, comprising a series of instructions stored on a computer-readable medium. The computer-readable medium can be any of the devices, or a combination of the devices, described above in connection with the memory system 114.

It should be understood to those skilled in the art, that some embodiments of systems or components for predicting critical effective k's or determining coolant flow rates at off-rated core conditions, as described herein, can have more or fewer computer processing system components and still be within the scope of the present disclosure.

Various embodiments of the processes and the correlations as described herein have been tested on several different off-rated power maneuvers, rod exchange sequences and startups and have been shown to provide significant improvements in the prediction of the critical effective k at off-rated states. Generally, the operating conditions where this increased accuracy in prediction is important is where the reactor is between 40% rated power to 100% rated power for reactor startup operations. For power maneuvers after startup, this increased accuracy is of primary importance for power ratings between 60% and 100%.

One or more embodiments as described herein has been shown to provide an improved prediction of the critical effective k or k eigenvalue to be used in reactor core planning for off-rated conditions including the determination of the coolant flow rate calculations. Some exemplary embodiments as described herein have been shown to reduce the error in the prediction of the critical k-eigenvalue to 70 to 80 pcm in most cases. This is a considerable increase in accuracy over prior methods and systems that provided for prediction errors on the order of 700 pcm, e.g., typically estimates of the critical effective k values (e.g., k-eigenvalues) at off-rated conditions were on the order of 700 pcm. As a result, the determination of the coolant flow rates at these off-rated states and conditions have been significantly improved.

Figure 6:
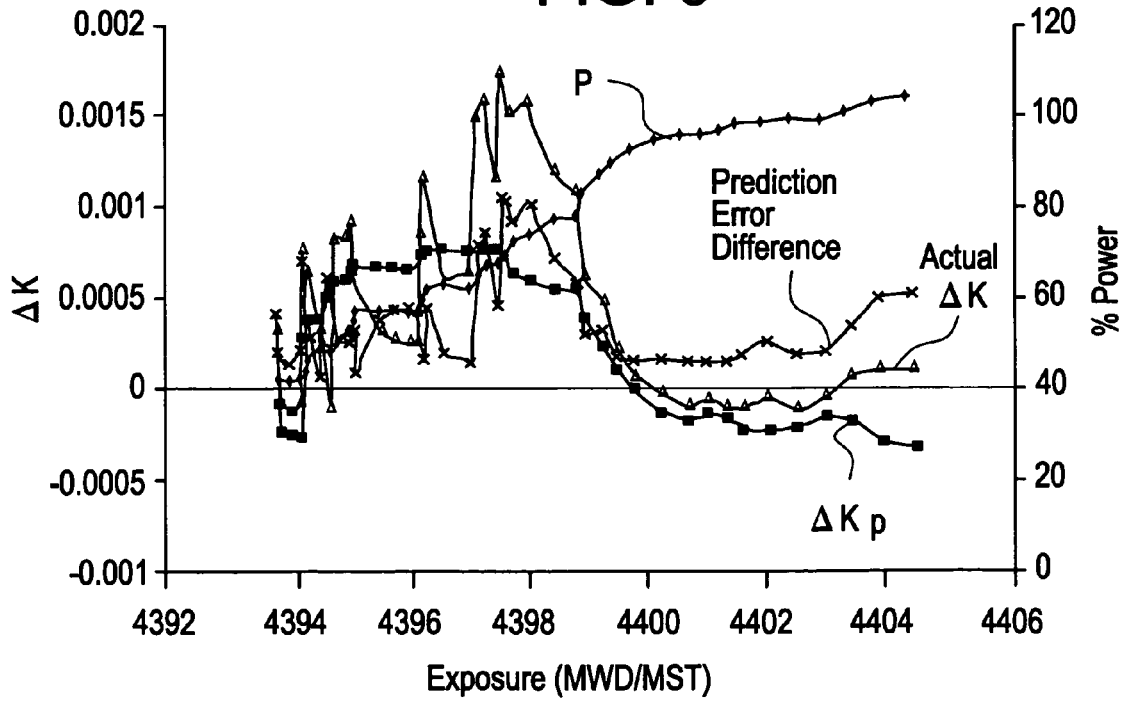
FIG. 6 is a graph of a beginning of cycle off-rated operation illustrating actual effective k values as a comparison of the predicted off-rated effective k values as illustrated in FIG. 2 according to one embodiment of the invention.

FIG. 6 illustrates a result of testing one embodiment of the method and systems described herein. FIG. 6 includes a comparison of actual monitored critical effective k to the predicted critical effective k for a beginning of cycle startup of a typical nuclear power plant as illustrated in FIG. 2. The difference between the predicted value and the actual value is also shown. Some of the methods and systems as described herein can provide improvements to the prediction of critical effective k's not only in the preferred applicability region from 40 percent power to 100 percent power, but also in other range (not shown in FIG. 6). The application of this disclosure can provide substantial improvements over previous methods and systems and have been shown to provide improvements in optimizing off-rated reactor operations.

When describing elements or features and/or embodiments thereof, the articles "a", "an", "the", and "said" are intended to mean that there are one or more of the elements or features. The terms "comprising", "including", and "having" are intended to be inclusive and mean that there can be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps can be employed.

What is claimed is:

1. A method for determining a critical effective k at an off-rated core state of a nuclear power plant, the method comprising:

determining for the off-rated core state a control rod density, a percent core power, a gadolinium reactivity worth, a doppler reactivity worth, and a xenon reactivity worth responsive to a control rod pattern, a reactor power plan including the off-rated core state, and a reference effective k;

calculating a change in an effective k from the reference effective k at the off-rated core state responsive to two or more parameters at the off-rated core state selected from the group consisting of the control rod density, the percent core power, the gadolinium reactivity worth, the doppler reactivity worth, and the xenon reactivity worth; and generating the critical effective k at the off-rated core state responsive to the change in the effective k from the reference effective k at the off-rated core state.

2. The method of claim 1, wherein the calculating a change in the effective k step includes determining a correlation quantifying the change in the effective k from the reference effective k at the off-rated core state based on at least one of a percent core power at the off-rated core state, a change in the gadolinium reactivity worth, a change in the doppler reactivity worth, a change in the xenon reactivity worth, and a change in the control rod density.

3. The method of claim 2, wherein the determining the correlation includes at least one of, determining at the off-rated core state a change in the doppler reactivity worth from a reference doppler reactivity worth associated with the reference effective k;

determining at the off-rated core state a change in the xenon reactivity worth from a reference xenon reactivity worth associated with the reference effective k;

determining at the off-rated core state a change in the gadolinium reactivity worth from a reference gadolinium reactivity worth associated with the reference effective k; and determining at the off-rated core state a change in the control rod density from a reference control rod density associated with the reference effective k.

4. The method of claim 2, wherein the determining the correlation includes identifying a coefficient for each correlation as a function of an exposure at the off-rated core state, a plant type, and a type of off-rated plant operation.

5. The method of claim 4, wherein the identifying a coefficient includes identifying an empirical correlation polynomial including a summary set of each correlation and coefficient reflecting the change in the effective k from the reference effective k at the off-rated core state, wherein the empirical correlation polynomial provides a model for changes to effective k for various off-rated core states of a nuclear core.

6. The method of claim 5, wherein the identifying the empirical correlation polynomial includes selecting a subset of the correlations within the empirical correlation polynomial based on the off-rated core state, a predetermined plant type, and a type of off-rated plant operation associated with the off-rated core state, wherein the determining the effective k change is responsive to the selected subset of correlations.

7. The method of claim 6 wherein selecting a subset of correlations includes creating a separate model for calculating the change in the effective k from the reference k for each off-rated core state based on the type of off-rated plant operation and for a startup off-rated plant operation, based also on the predetermined plant type.

8. The method of claim 6, further comprising:
measuring an effective k during an off-rated core state;
comparing the determined critical effective k to the measured effective k; and
selecting a plant type from the group consisting of xenon driven and gadolinium driven in response to the comparing,
wherein selecting the subset of correlations is responsive to the selected plant type.

9. The method of claim 8 wherein the nuclear power plant is a first nuclear power plant and wherein selecting the power plant type for the first nuclear power plant is performed during a core modeling of the first nuclear power plant, further comprising a second nuclear power plant, wherein selecting a power plant type for the second nuclear power plant is during a core modeling of the second nuclear power plant.

10. The method of claim 6 wherein selecting the subset of correlations is responsive to a type of off-rated operation selected from the group consisting of beginning of cycle, in cycle start-up, power maneuver down power, power maneuver up power, rod exchange sequence down power, and rod exchange sequence up power.

11. The method of claim 6 wherein the off-rated plant operation associated with the off-rated core state is a beginning of cycle and the predetermined plant type is xenon driven, the selected subset of correlations are responsive to the set of parameters consisting of the change in the control rod density, the percent core power, and the change in xenon reactivity worth.

12. The method of claim 6 wherein the off-rated plant operation associated with the off-rated core state is a beginning of cycle and the predetermined plant type is a xenon driven plant type, the selected subset of correlations are responsive to the set of parameters consisting of the change in the control rod density, the percent core power, the change in the gadolinium reactivity worth, and the change in the doppler reactivity worth.

13. The method of claim 6 wherein the off-rated operation type is a down power maneuver, the selected subset of correlations responsive to the set of parameters consisting of the change in the control rod density, the percent core power, the change in the xenon reactivity worth, a change in the doppler reactivity worth, a change in the gadolinium reactivity worth.

14. The method of claim 6 wherein the off-rated operation type is an up power maneuver, the selected subset of correlations responsive to the set of parameters consisting of the change in the control rod density, the percent core power, the change in the xenon radioactivity worth, the change in the gadolinium reactivity worth, and the change in the doppler reactivity worth.

15. The method of claim 2 wherein the reactor power plan includes an exposure defining, at least in part, the off-rated core state.

16. The method of claim 1 wherein the reference effective k is selected from the group consisting of a design basis effective k for the beginning of cycle startups and a last recorded rated effective k for the in cycle startups and power maneuvers.

17. The method of claim 1, further comprising determining a core coolant rate for the off-rated core state responsive to the generated critical effective k, the control rod pattern, and the reactor power plan.

18. The method of claim 1 wherein generating the critical effective k at the off-rated core state includes adding the change in the effective k at the off-rated core state to the reference k at the off-rated core state.

19. The method of claim 1, further comprising:
determining the control rod density, the percent core power, the gadolinium reactivity worth, the doppler reactivity worth, and the xenon reactivity worth for each of a plurality of off-rated core states responsive to the control rod pattern plan, the reactor power plan including the plurality of off-rated core states, and one or more reference effective k's associated with the plurality of off-rated core states;
calculating the change in the effective k from an associated reference effective k at each of the plurality off-rated core states responsive to two or more parameters at the off-rated core states selected from the group consisting of the control rod density, the percent core power, the gadolinium reactivity worth, the doppler reactivity worth, and the xenon reactivity worth; and
generating the critical effective k at each of the off-rated core states responsive to the associated change in the effective k for each off-rated core state.

20. The method of claim 19, further comprising determining a core coolant rate plan responsive to the generated critical effective k's for each off-rated core state, the control rod pattern, and the reactor power plan.

21. A method for modeling critical effective k's at a plurality of off-rated core states in an off-rated plant operation of a reactor in a nuclear power plant, the method comprising:
estimating, for a plurality of off-rated core states, a control rod density, a gadolinium reactivity worth, a Doppler reactivity worth, and a xenon reactivity worth responsive to a control rod pattern, a reactor power plan defining the off-rated core states and one or more reference effective k's;
calculating a change in the control rod density, a change in the gadolinium reactivity worth, a change in doppler reactivity worth, and a change in xenon reactivity worth, each change being calculated relative to the corresponding received reference value and associated with each off-rated core state;
determining a plurality of correlations affecting a neutron balance within the reactor at each off-rated core state responsive to the percent core power, the change in the gadolinium reactivity worth, the change in the doppler reactivity worth, the change in the xenon reactivity worth, and the change in the control rod density;
determining a change in the effective k in response to the determined correlations;

determining an estimated critical effective k as a function of the determined change in effective k for each off-rated core state;

comparing an actual critical effective k for one or more of the off-rated core states to the estimated critical effective k for the corresponding off-rated core states;

selecting a type of plant from the group consisting of a xenon driven plant and a gadolinium driven plant, responsive to the comparing;

identifying a plurality of coefficients wherein at least one coefficient is identified for each of the determined correlations as a function of an exposure at the off-rated core state, the selected plant type, and a type for the off-rated plant operation; and selecting a subset of the correlations and coefficients in response to the selected plant type and the type of off-rated plant operation.

22. The method of claim 21, further comprising:

receiving the control rod pattern, the reactor power plan defining the plurality of off-rated core states for the off-rated reactor operation, the one or more reference effective k's, a reference control rod density, a reference gadolinium reactivity worth, a reference doppler reactivity worth and a reference xenon reactivity worth;

measuring a plurality of parameters during one or more off-rated reactor operations of the reactor including an actual gadolinium reactivity worth, an actual xenon reactivity worth, an actual doppler reactivity worth, an actual control rod density, and an actual percent core power; and determining the actual critical effective k for one or more of the off-rated core states responsive to measuring the plurality of parameters.

23. The method of claim 22, further comprising:

receiving second control rod pattern, a second reactor power plan defining a second plurality of off-rated core states for a particular type of off-rated reactor operation and the off-rated core states, a second plurality of reference effective k's, a second reference control rod density, a second reference gadolinium reactivity worth, a second reference doppler reactivity worth and a second reference xenon reactivity worth;

predicting, for one or more of the second off-rated core states in the second reactor power plan, a change in the effective k from a corresponding second reference effective k, the predicting being responsive to the selected subset of correlations and coefficients; and generating, for each one or more predicted off-rated core state, a second critical effective k responsive to each predicted change in effective k from the second reference effective k and one or more of the received second reference control rod density, second reference gadolinium reactivity worth, second reference doppler reactivity worth, and second reference xenon reactivity worth.

24. The method of claim 23, further comprising modeling a core coolant flow rate plan responsive to generating the critical effective k's for each off-rated core state, the second control rod pattern, and the second reactor power plan.

* * * * *